(12) United States Patent
Pearson et al.

(10) Patent No.: US 7,235,980 B2
(45) Date of Patent: Jun. 26, 2007

(54) CABLE DETECTION APPARATUS AND METHOD

(75) Inventors: Richard D. Pearson, Bristol (GB); James Ian King, Bath (GB)

(73) Assignee: Radiodetection Limited, Bristol (GB)

( * ) Notice: Subject to any disclaimer, the term of this patent is extended or adjusted under 35 U.S.C. 154(b) by 0 days.

(21) Appl. No.: 11/311,427

(22) Filed: Mar. 21, 2006

(65) Prior Publication Data

US 2006/0158172 A1    Jul. 20, 2006

Related U.S. Application Data

(62) Division of application No. 10/402,143, filed on Mar. 31, 2003, now Pat. No. 6,977,508.

(51) Int. Cl.
*G01R 31/02* (2006.01)
*G01R 19/00* (2006.01)
*G01V 3/08* (2006.01)

(52) U.S. Cl. .................. 324/542; 324/67; 324/326

(58) Field of Classification Search .......... 324/542, 324/539, 537, 500, 260, 326, 543, 173, 175, 324/67, 158.1, 74, 247, 527, 613
See application file for complete search history.

(56) References Cited

U.S. PATENT DOCUMENTS

| | | | |
|---|---|---|---|
| 4,438,401 A | | 3/1984 | Iwamoto et al. ............ 324/326 |
| 4,626,803 A | * | 12/1986 | Holm ........................ 332/151 |
| 5,065,098 A | * | 11/1991 | Salsman et al. ............ 324/326 |
| 5,260,660 A | | 11/1993 | Stolarczyk .................. 324/338 |
| 5,321,361 A | * | 6/1994 | Goodman ................... 324/326 |
| 5,438,266 A | | 8/1995 | Tsang ......................... 324/326 |
| 5,744,739 A | * | 4/1998 | Jenkins ......................... 84/603 |
| 5,764,061 A | | 6/1998 | Asakawa et al. ........... 324/326 |
| 6,114,871 A | * | 9/2000 | Shiota et al. ............... 324/772 |
| 6,130,539 A | | 10/2000 | Polak ......................... 324/326 |
| 6,407,550 B1 | * | 6/2002 | Parakulam et al. ......... 324/326 |
| 6,411,094 B1 | | 6/2002 | Gard et al. ................. 324/326 |
| 6,617,856 B1 | * | 9/2003 | Royle et al. ................ 324/329 |
| 6,707,305 B2 | * | 3/2004 | Johnson et al. ............. 324/542 |
| 6,933,712 B2 | * | 8/2005 | Miller et al. .................. 324/67 |
| 7,009,375 B1 | * | 3/2006 | Vokey et al. ................. 324/67 |
| 2003/0001556 A1 | | 1/2003 | Doany et al. ................. 324/67 |
| 2004/0145486 A1 | | 7/2004 | Campbell et al. ........... 340/635 |

FOREIGN PATENT DOCUMENTS

GB    1488847    10/1977

* cited by examiner

*Primary Examiner*—Andrew H. Hirshfeld
*Assistant Examiner*—Hoai-An D. Nguyen
(74) *Attorney, Agent, or Firm*—Baker & Hostetler LLP

(57) ABSTRACT

A cable detection apparatus is disclosed having a filter, the filter transmitting components of a signal detected substantially at certain harmonics of a first frequency. The filter may also attenuate the signal at certain even harmonics thereof. A method of detecting and/or locating cables in the same manner is also disclosed.

6 Claims, 7 Drawing Sheets

FIG. 9
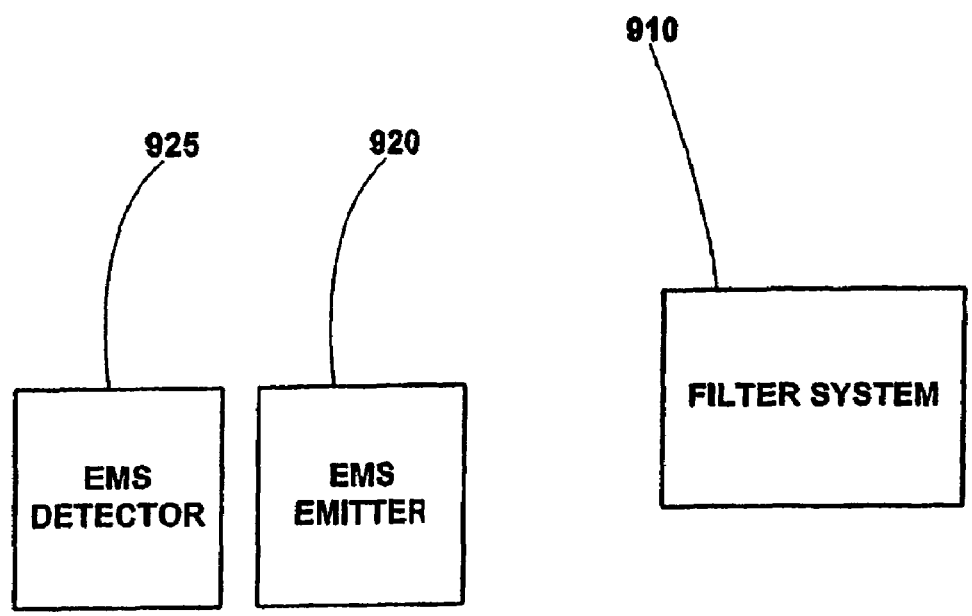
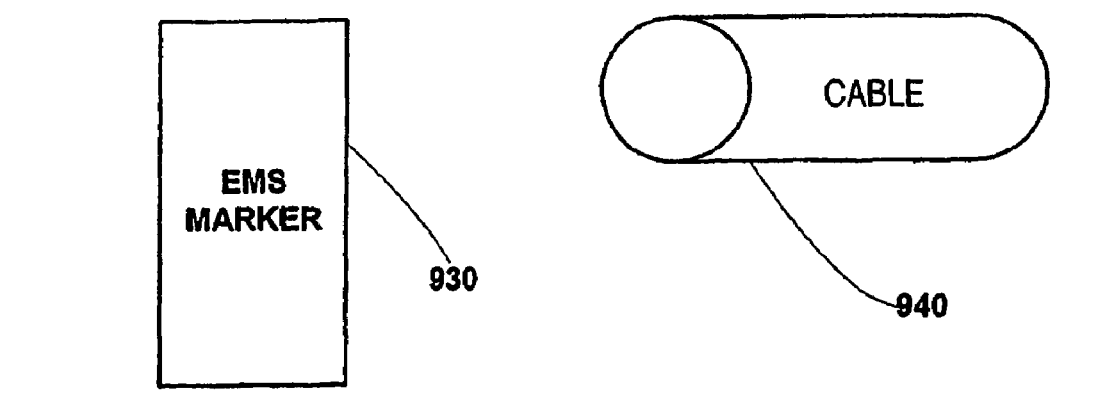

CABLE DETECTION APPARATUS AND METHOD

CROSS-REFERENCE TO RELATED APPLICATIONS

This application claims priority to and is a divisional of U.S. patent application entitled, CABLE DETECTION APPARATUS AND METHOD, filed Mar. 31, 2003, having a Ser. No. 10/402,143, now U.S. Pat. No. 6,977,508, the disclosure of which is hereby incorporated by reference in its entirety.

FIELD OF THE INVENTION

The present invention relates to reduction of noise in cable detection systems.

BACKGROUND OF THE INVENTION

Before commencing excavation or other work where power or other cables may be buried, it is important to determine the location of the cables to ensure that they are not damaged during the work. It is also useful to be able to track the path of buried or otherwise inaccessible power cables. It is known to use detectors that detect the electromagnetic field emitted by power cables carrying alternating currents.

The electromagnetic field emitted by a power cable has a fundamental frequency equal to the frequency of the alternating current carried by the cable. However, harmonic frequencies (multiples in frequency) of this fundamental frequency are generally also emitted. The harmonics are emitted at two, three, four, etc times the fundamental frequency. The second, fourth, sixth etc harmonics are called even harmonics, and the third, fifth, seventh etc harmonics are called odd harmonics. Frequencies that are neither even, odd harmonics nor the fundamental frequency are non-harmonic frequencies.

Cables that do not directly carry currents may also be detected by power currents, as neighbouring power cables, and even overhead power lines can induce signals at power cable frequencies and harmonies thereof onto these cables. Ground return currents from appliances can also travel along non-power cables.

Electromagnetic signals emitted from power and other cables are useful in detecting power and/or other cables because the detector need not be connected to the cable to be located, and the signals are emitted by the cable without any additional reference signal needing to be added to the current flow. In other words, the cable can be in use while it is being detected, and it need not be isolated. Therefore, a passive sensor or detector may be used to detect the cable, and the power consumption of the detector is reduced. However, use of electromagnetic fields in detection can be compromised by high levels of noise being detected along with the signal from the cable to be located. In the present invention, noise relates to spurious, non-periodic noise, and periodic noise outside the frequencies emitted by the object to be located. Such noise problems decrease the accuracy of detection and location, and are therefore undesirable. There is therefore a need to reduce the effects of noise in detected signals, for example in order to more accurately detect/locate buried objects.

SUMMARY OF THE INVENTION

According to a first aspect of the invention, there is provided a cable detection or location device comprising a filter that can reduce the effects of interference on an electromagnetic field emitted from a buried, underground or otherwise inaccessible object. The filter filters the signal received at the device, and suppresses certain frequency components. Non-harmonic frequencies of the frequency of the alternating current carried by the cable to be detected/located (the fundamental frequency) are suppressed. The system therefore reduces noise that is non-periodic, and frequencies of the detected signal that do not correspond to part of the signal emitted from the cable to be detected. The signal to noise ratio can therefore be increased in a detector.

It has also been noticed by the inventors that the signal emanating from a typical three-phase power cable has a spectrum that contains most energy in the odd harmonics of the fundamental frequency of the alternating current, with little energy in the even harmonics of the fundamental frequency. This is because even harmonics are caused by part rectification of the alternating current, which is avoided by electricity providers and generators. Manufacturers of electrical appliances also manufacture them so that they do not draw a part rectified current when operating. Therefore, in an embodiment of the invention, even harmonics are suppressed by the filter as well as non-harmonic frequencies. A high proportion of noise added to an electromagnetic signal will be spread across the frequency spectrum, and so retaining only the fundamental frequency and odd harmonics thereof will filter out a high proportion of the noise. However, this will retain a high proportion of the signal, and so increase the signal to noise ratio in the invention.

In an embodiment of the invention, two filters are provided, one of which removes non-harmonic noise, and the other of which removes non-harmonic noise and even harmonics of the fundamental frequency. The fundamental frequency may be 50 Hz or 60 Hz, or another frequency, as appropriate. In an embodiment of the invention there are provided a plurality of filters that remove non-harmonic noise. In an embodiment of the invention there are provided a plurality of filters that remove non-harmonic noise and even harmonics of the fundamental frequency. In an embodiment of the invention there are a combination of two types of filter (removing non-harmonic noise, and removing non-harmonic and even harmonic noise) arranged in series to progressively filter the detected signal. In an embodiment of the invention, at least one comb filter is used in the filter of the device.

In an embodiment of the invention, as well as use of a passive detector to locate power cables, one or more active sensors may also be used. The active sensors, or EMS emitters, emit electromagnetic signals at one or more predetermined frequencies, which are received by EMS (Electromagnetic Marker System) markers, which are commonly buried in the ground. When irradiated with an electromagnetic field at certain frequencies, EMS markers resonate and re-radiate an electromagnetic field at the same frequency as the irradiation frequency. This re-radiated signal is then detected by an EMS detector. The EMS detector may be a separate detector to that used for the passive sensing, although it may be housed in the same unit as the passive sensor.

The EMS detector can then detect the EMS markers, which are commonly used to mark the location of cables, such as non-metallic cables, and to mark specific points in the ground. EMS markers that mark different types of buried object can be made to resonate at different frequencies, so that by detecting the re-radiated field at a certain frequency, the location of a specific type of marker, and therefore a specific type of buried object, can be found. The emission of such fields from the EMS emitter could interfere with the passive sensing, in effect, generating electromagnetic noise. However, by choosing emission frequencies that coincide with the high attenuation frequencies of the filter of the device, the emitted radiation for the active locate of the device does not interfere with the passive location of power cables, because the emitted signal detected by the passive system is filtered out by the filter of the device. Therefore both passive and active locate modes can detect objects at the same time.

In an embodiment, the apparatus outputs audio signals, representing the filtered signals, at a frequency corresponding to a high attenuation frequency of the apparatus, which will then not be fed back into the apparatus, so reducing interference in the system.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Embodiments of the invention will now be described, purely by way of example, with reference to the accompanying drawings, in which:

FIG. 9 shows a schematic diagram of a further device incorporating a filter system according to any of FIGS. 3, 5, 6, or 8.

DETAILED DESCRIPTION OF THE INVENTION

Figure 1:
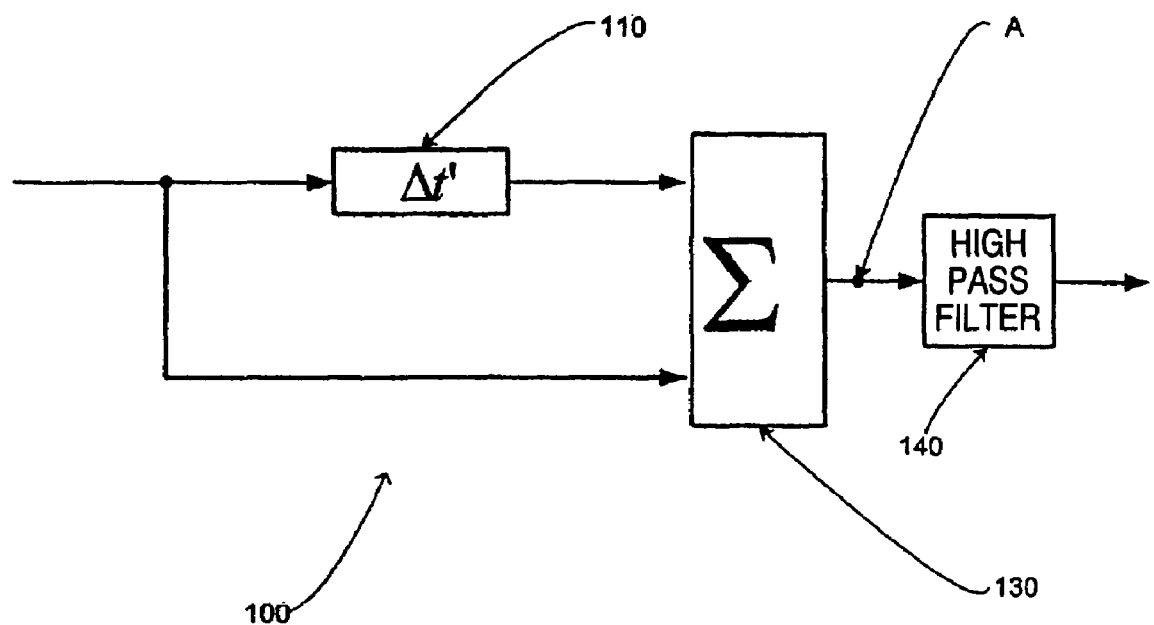
FIG. 1 shows a filter for use in a cable detection apparatus according to a first embodiment of the invention.

FIG. 1 shows a type 1 comb filter 100 for use in a cable detection apparatus according to a first embodiment of the invention. The filter comprises a time delay unit 110, and an adder 130. In the present embodiment, a signal input into the filter 100 comprises multiple frequency components. The input signal is split; half is delayed by a time internal $\Delta t'$ by the time delay unit 110 before being output to the adder 130, while the other half is input directly into the adder 130. The adder 130 outputs the sum of the two inputs and therefore has a peak in transmittance when the time delay is an exact multiple of the cycle length or period, of the input signal.

An optional high pass filter 140 is also included. The high pass filter removes D.C. signals. In an embodiment, the high pass filter also removes the fundamental frequency of the signal passed through the filter 100. The filter 140 may alternatively be omitted.

Figure 2:
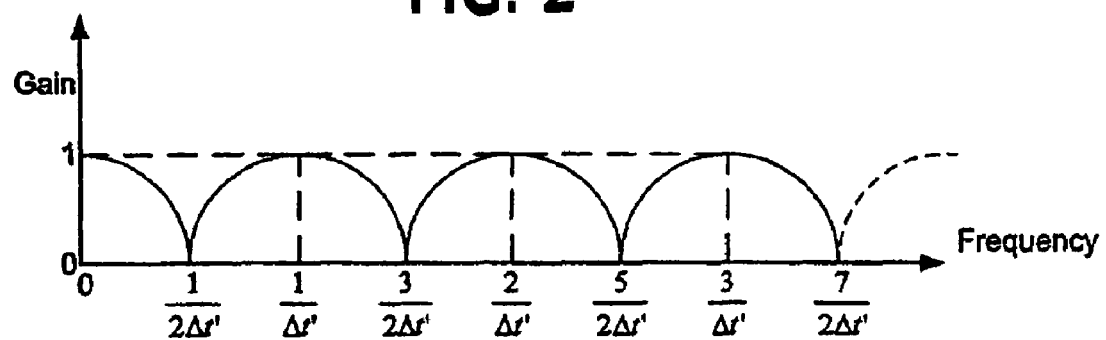
FIG. 2 shows a typical frequency response for the filter of FIG. 1.

A typical frequency response of the type 1 filter at point A is given in FIG. 2. The frequency response gives peaks in transmission when the time delay ($\Delta t'$) is equal to the period of the signal and at multiples thereof. The high pass filter, if employed, removes the frequency response peaks at 0 Hz (i.e. D.C.) and at $1/\Delta t'$Hz.

Figure 3A:
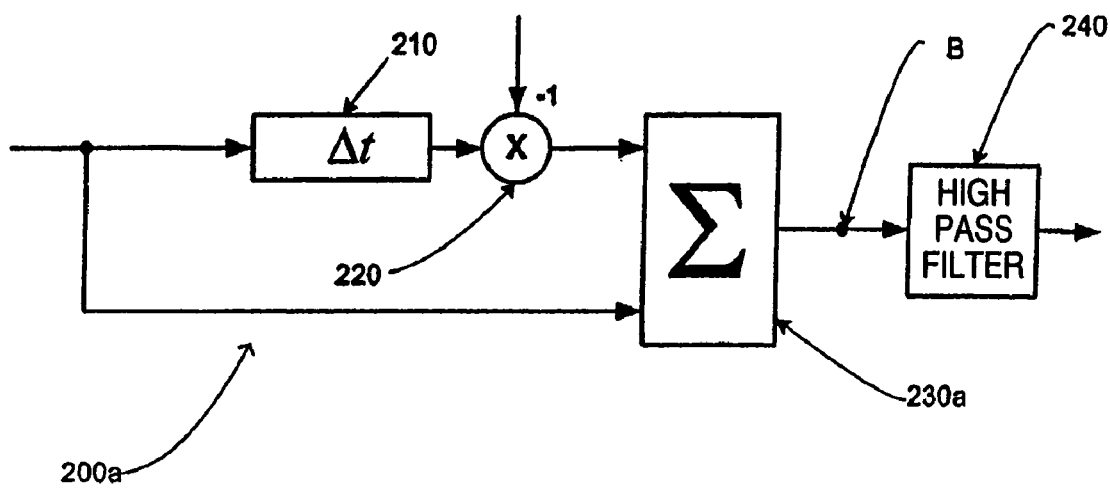
FIGS. 3a and 3b show further filters for use in a cable detection apparatus according to a second embodiment of the invention.

FIG. 3a shows a schematic of a type 2 comb filter 200a, used in a device for detection of cables according to a second embodiment of the invention, which can be used either on its own or with one or more type 1 comb filters according to embodiments of the present invention. The filter 200a comprises a time delay unit 210 to receive an input signal, an inverter 220 connected to the time delay unit 210, and an adder 230a connected to the inverter 220 and also to receive the input signal.

The type 2 filter 200a operates by firstly receiving and splitting an input signal. The type 2 filter 200a differs from the type 1 filter 100 in that it has an inverter 220.

In the present embodiment, the signal comprises multiple frequency components. The input signal is split to the time delay unit 210, as well as directly to the adder 230a. The inverter 220 receives the output from the time delay unit 210 and inverts the signal received by it (multiplies it by −1) and outputs the inverted signal to the adder 230a. The adder 230a outputs the sum of its two inputs. The adder 230a therefore has peak transmittance at frequencies where the time delay of $\Delta t$ causes the signal output from the time delay unit 210 to be the inverse of that input into the time delay unit 210 as, at such frequencies, the signal inverted by the inverter 220 is restored by the time delay unit 210 and is the same as the signal supplies directly to the adder 230a.

Figure 3B:
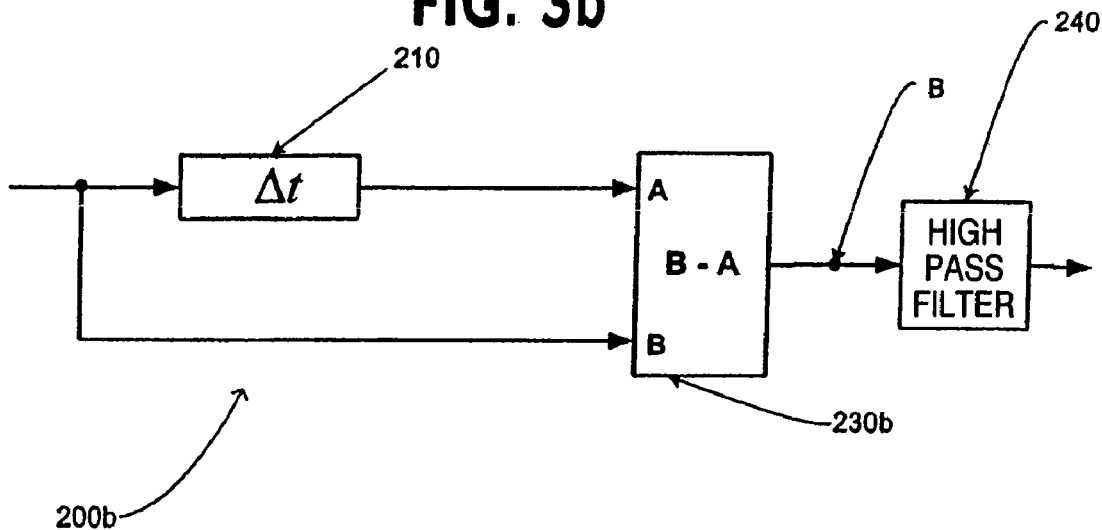

An alternative type 2 filter 200b shown in FIG. 3b omits the inverter, and the adder 230a is replaced by a subtractor 230b. The subtractor 230b, instead of summing the two signals received by it, subtracts the delayed signal from the time delay unit 210 from the direct signal received. This arrangement also gives a type 2 filter for use in a cable detection apparatus according to an embodiment of the invention.

An optional high pass filter 240 is employed in embodiments of the invention with type 2 filter 200*a*, 200*b* shown in FIGS. 3*a* and 3*b*. The high pass filter 240 filters out the fundamental frequency (½Δt) from the signal output from the filter 200*a*, 200*b*. The filter 240 may alternatively be omitted.

Figure 4:
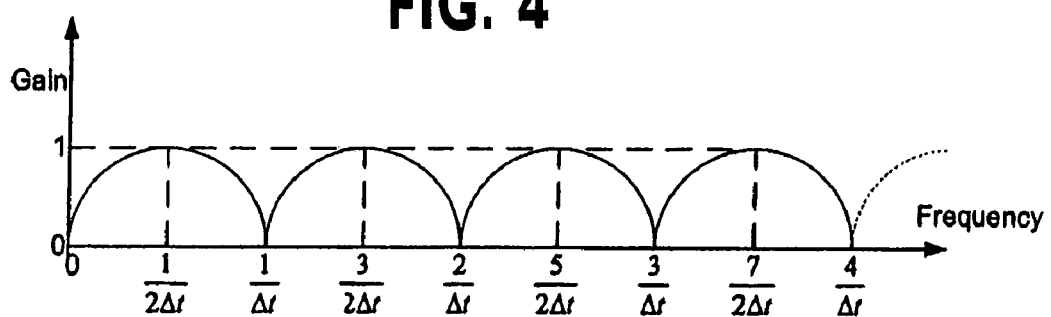
FIG. 4 shows a typical frequency response for the filter of FIG. 3.

FIG. 4 shows a typical frequency response for the type 2 filter 200*a*, 200*b* at point B. In the present embodiment, the time delay unit 210 imparts a time delay (Δt). The filter 200*a*, 200*b* has peak attenuation where the time delay (Δt) is the same as the period of the input signal, or a multiple thereof. There are peaks in transmission at frequencies corresponding to half way between the peak attenuation frequencies.

If, for example, the type 1 and type 2 filters were arranged to have the same time delay, the type 1 filter 100 would give peak transmission at frequencies where the type 2 filter 200*a*, 200*b* gave peak attenuation and vice versa.

If, however, different time delays are used for the type 1 and type 2 comb filters, different frequency attenuation profiles can be obtained. A time delay (Δt') in the type 1 filter of FIG. 1 of 20 ms will have high transmittance at a frequency of 50 Hz and all harmonics thereof, as shown in FIG. 2. Between the peak transmission frequencies are peak attenuation frequencies. The type 1 filter can therefore remove non-harmonic noise from a signal detected by a cable detection apparatus.

The filter 200*a*, 200*b* is arranged to filter signals from a cable carrying alternating current at 50 Hz, corresponding to use in the United Kingdom. A time delay of 10 ms is used. A filter in a device for detecting cables carrying alternating current at 60 Hz, for example in the United States of America, the time delay (Δt) would be 8.3 ms, and all following calculation would follow from that calculated time delay.

Using such a time delay, the filter 200*a*, 200*b* has peaks in attenuation at all even harmonics of the fundamental frequency (50 Hz) of the alternating current in the cable to be detected. The filter 200*a*, 200*b* has peaks in transmission at the fundamental frequency and all odd harmonics thereof. As has been discussed above, most of the signal in typical 3-phase alternating current carrying cables is in the odd harmonic frequencies. Therefore, by removing some or all even harmonic frequencies, the noise levels from non-periodic interference, and interference at even harmonic frequencies is reduced, while transmitting the fundamental and odd harmonic frequencies of the signal. The signal to noise ratio is therefore improved. The fundamental frequency is also suppressed in the case where a high pass filter 240 is used.

Figure 5:
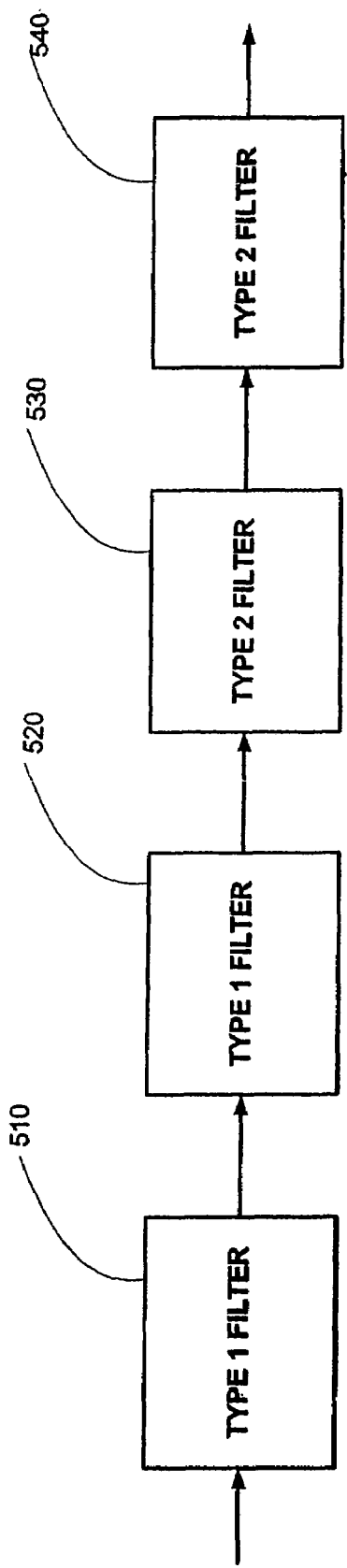
FIG. 5 shows a filter system comprising a number of filters of FIGS. 1 and 3.

FIG. 5 shows a filter system according to a third embodiment of the invention. The filter system comprises a first and second type 1 comb filter 510 and 520, of the type discussed above, and a first and second type 2 comb filter 530 and 540, as discussed above, cascaded, i.e. connected in series. In embodiments of the invention, a single type 1 filter 100 can be used with a single type 2 filter 200*a*, 200*b*. Use of the two filters together will result in reduction of even harmonics and increased removal of non-harmonic noise, compared with use of a single type 1 filter. Alternatively, multiple type 1 and/or type 2 filters can be used in combination, which will lead to an increased removal of non-harmonic and even harmonic noise.

As discussed above, the type 1 filters have a time delay (Δt') of 20 ms. The type 2 filters have a delay (Δt) of 10 ms. The filters are thus tuned have peak transmittance at a fundamental frequency of 50 Hz. The type 1 filters reduce non-harmonic noise, and the type 2 filters then reduce the even harmonics of the fundamental frequency as well as non-harmonic noise. This corresponds to detection of cables carrying alternating current at 50 Hz, as stated above. For detection of currents at 60 Hz, the type 1 filters 510 and 520 could have a time delay Δt' of 16.6 ms, and the type 2 filters 530 and 540 a delay Δt of 8.3 ms.

Figure 6:
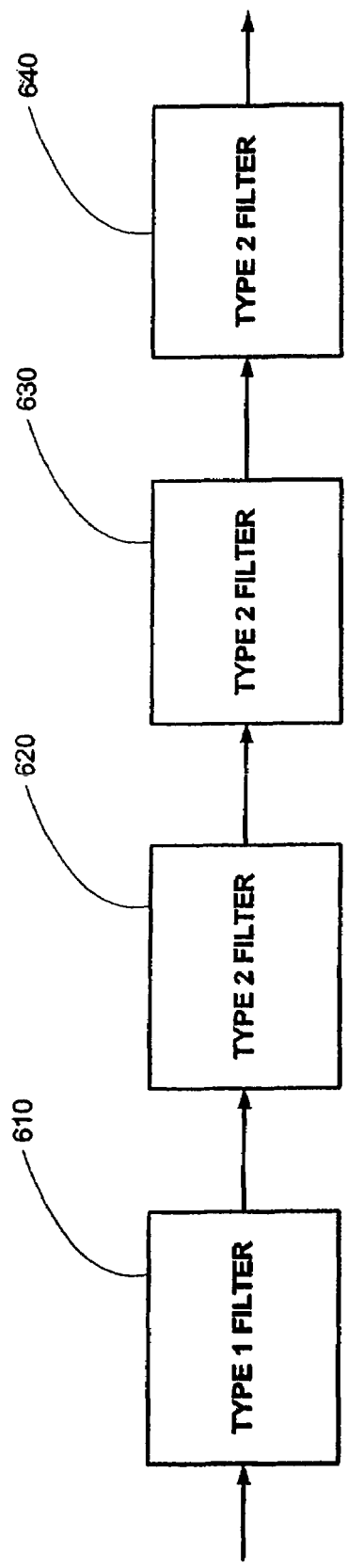
FIG. 6 shows an alternative filter system comprising a number of filters of FIGS. 1 and 3.
Figure 7:
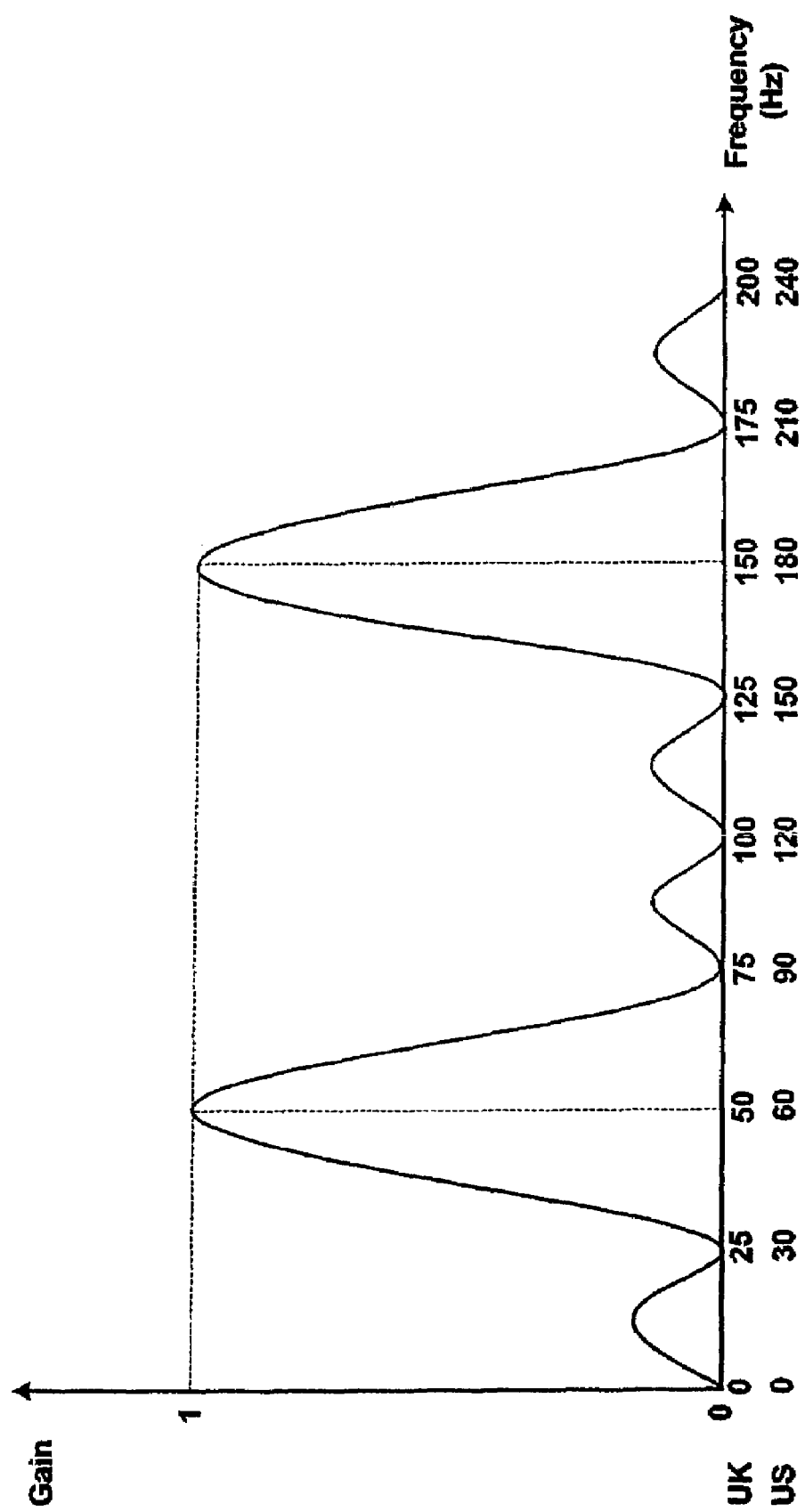
FIG. 7 shows a typical frequency response for the filter systems of FIG. 5 and FIG. 6.

FIG. 6 shows an alternative cascade system arrangement, which also reduces the non-harmonic noise and even harmonics of the fundamental frequency. The second type 1 filter is replaced with a type 2 filter. Either cascade system will produce a frequency response similar to that shown in FIG. 7. Other combinations of such filters are also possible in order to achieve the desired filter effect. As shown in FIG. 7, the ratio of gain of non-harmonic, or even harmonic, frequencies output from the cascade system, to the gain of the fundamental frequency and odd harmonics is increased from the use of a single type 2 filter, and greatly improved over the input signal. The signal to noise ratio is therefore improved. FIG. 7 shows a frequency response for detection of cables in both the United Kingdom and the U.S.A., i.e. detection of cables carrying either 50 Hz or 60 Hz alternating current. If one or more of the optional high pass filters 140, 240 are employed, the peak at the fundamental frequency may be removed and only odd harmonic frequencies are transmitted through the cascade filter system.

Figure 8:
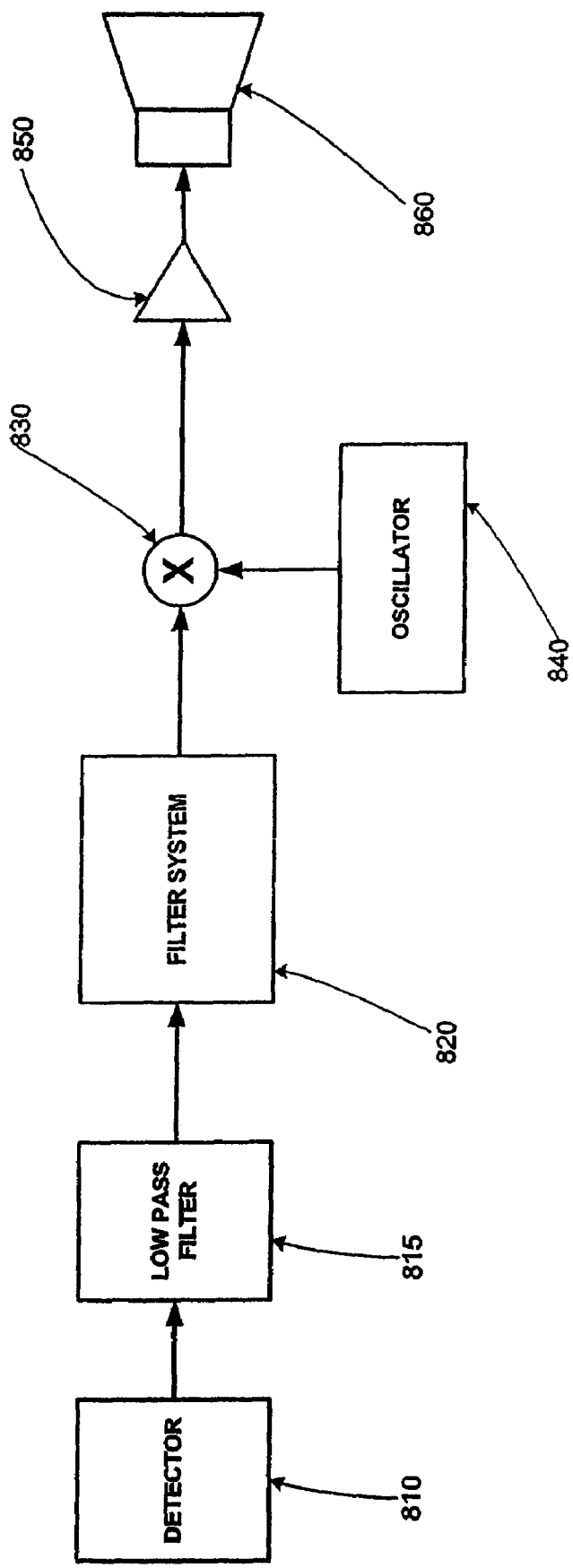
FIG. 8 shows a schematic diagram of a device incorporating a filter system according to any of FIGS. 3, 5 or 6.

FIG. 8 shows a schematic diagram of a cable detection device of a further embodiment of the present invention in which a filter system as described above is used, together with an audio indication system. The device comprises an antenna 810 for receiving signals from a power cable or a cable with power currents induced on it, a low pass filter 815, a filter system 820, as described above, to filter the received signal, a multiplier 830 connected to an oscillator 840 for frequency shifting the filtered signal, an amplifier 850 for amplifying the frequency shifted signal before being output from a loudspeaker 860.

The detected signal from an antenna 810 in the device is input into the low pass filter 815, to remove frequency components above a predetermined frequency. In the present embodiment, the predetermined frequency is set to be 1 kHz. However, it will be appreciated that the value of the predetermined frequency will be determined in relation to the value of the fundamental frequency that is to be detected. If the fundamental frequency to be detected is higher than 50 Hz, the predetermined frequency can be adjusted appropriately.

The low pass signal is then input into the filter system 820. The filter system 820 reduces non-harmonic and even harmonic content of the signal. If one of more optional high pass filters 140, 240 are employed, the fundamental frequency may also be removed. The signal output from the filter system 820 is then input into a multiplier 830. As well as the filtered signal, the multiplier 830 also receives an input from an oscillator 840. The oscillator oscillates at a frequency determined to frequency shift the signal so that high attenuation frequencies of the signal are shifted to high transmittance frequencies of the signal after frequency shifting. In the present invention, the oscillator is set to input a frequency signal of 975 Hz into the multiplier. The multiplier then multiplies the filtered signal to produce an audio frequency signal. However, in addition to the signal being audio frequency, because only odd harmonics are transmitted through the filter system, the frequency shift is such that any noise from the audio stage being fed back into the detector and filter system will be shifted from an odd harmonic to an even harmonic of the fundamental frequency.

Therefore, the filter system will filter out this feedback, and the audio stage does not provide interference in the detected signal.

According to a further embodiment of the invention, the filter system making use of at least one type 2 filter may be used in conjunction with an EMS marker system emitter. The same principle as in previous embodiments is used in this embodiment. Such an embodiment is shown in FIG. 9. The system comprises a filter 910 according to any of the embodiments with a type 2 filter, an electromagnetic emitter 920 and an EMS detector 925.

The emitter 920 is set to emit a burst frequency of radiation that is an even harmonic of the alternating current frequency in a cable 940 to be detected. All harmonics of this even harmonic burst frequency will, in turn, be even harmonics of the frequency carried by the cable 940. Therefore, by emitting radiation bursts at an even harmonic frequency of the alternating current on the cable 940, the emitted radiation from an active locator will be attenuated by the filter system 910 and will not interfere with detection of the cable 940. This allows both modes of location (active and passive) to be operating at the same time, even within the same device, so that a cable 940 can be tracked, while the EMS detector 925 also scans for EMS markers 930 denoting other features in the vicinity of the cable 940. Alternatively, an EMS marker 930 may be located, and then, while still keeping a reference of the position of the EMS marker 930, any power cables 940 in the vicinity of the device can be detected.

Figure 10:
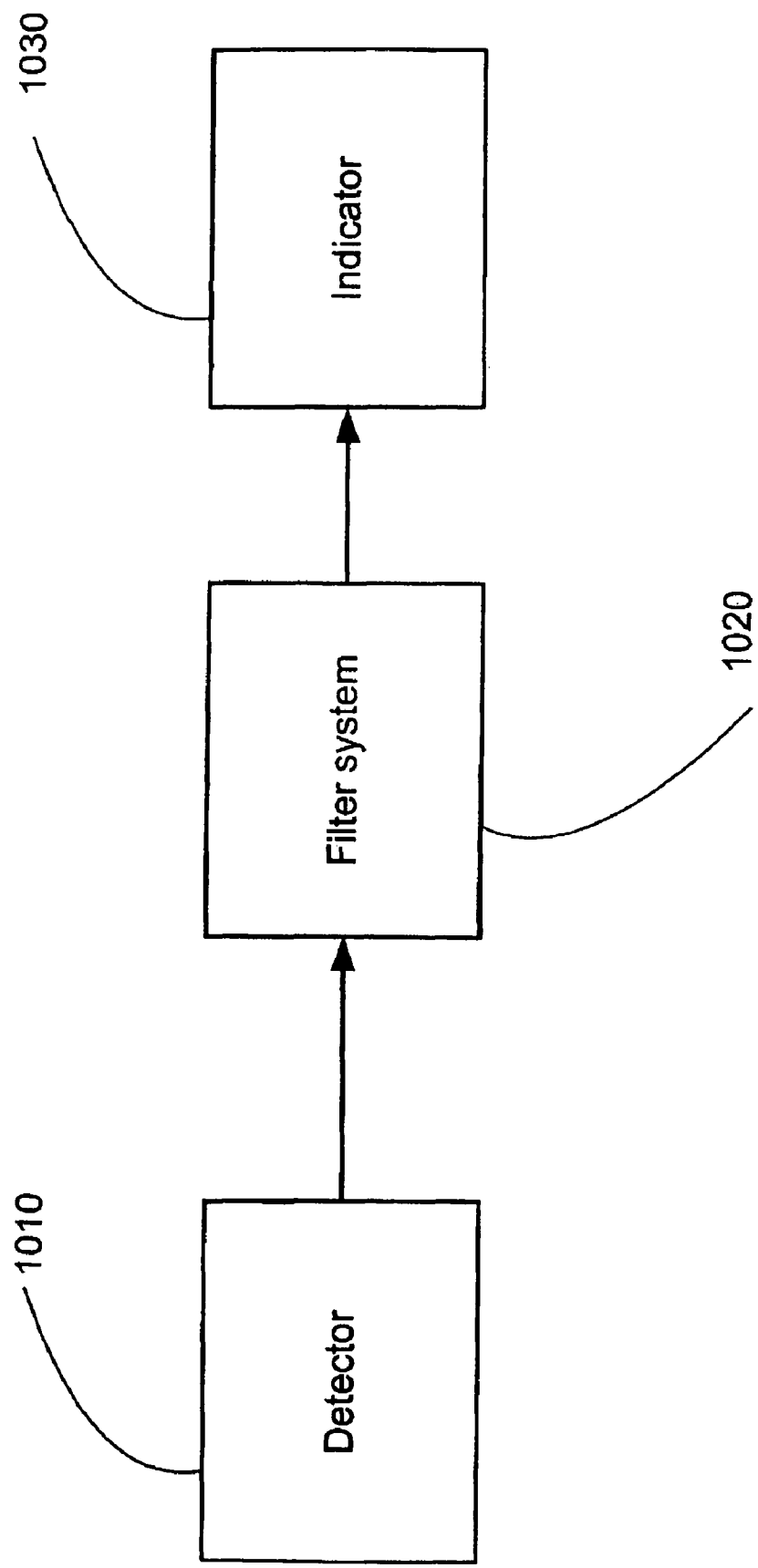
FIG. 10 shows a schematic diagram of a further device incorporating a filter system according to any of FIGS. 1, 3, 5 or 6.

FIG. 10 shows a basic cable detection apparatus according to embodiments of the invention. The apparatus comprises a filter system 1010 as described above, which receives cable detection input signals from an electromagnetic detection device 1020. The filter system 1010 outputs filtered signals to an indicator 1020, which indicates the detection of a cable based on the detected signal.

The present invention has been described particularly in relation to comb filters, and particular arrangements and combinations of comb filters. However, it should be noted that the invention is not limited to these particular arrangements and combinations, but that any filter system giving a result of attenuating the non-harmonic signals or even harmonics of one or more fundamental frequencies are within the scope of the invention.

The present invention can be implemented in hardware, software, firmware, and/or combinations thereof, including, without limitation, gate arrays, programmable arrays ("PGAs"), Field PGAs ("FPGAs"), application-specific integrated circuits ("ASICs"), processors, microprocessors, microcontrollers, and/or other embedded circuits, processes and/or digital signal processors, and discrete hardware logic. The present invention can be implemented with digital electronics, with analogue electronics and/or combinations of digital and analogue electronics.

The present invention has been described above purely by way of example, and modifications can be made within the spirit of the invention. The invention has been described with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognise that these functional building blocks can be implemented by discrete components, application specific integrated circuits, processors executing appropriate software and the like or any combination thereof.

The invention also consists in any individual features described or implicit herein or shown or implicit in the drawings or any combination of any such features or any generalisation of any such features or combination, which extends to equivalents thereof. Thus, the breadth and scope of the present invention should not be limited by any of the above-described exemplary embodiments. Each feature disclosed in the specification, including the claims, abstract and drawings may be replaced by alternative features serving the same, equivalent or similar purposes, unless expressly stated otherwise.

Any discussion of the prior art throughout the specification is not an admission that such prior art is widely known or forms part of the common general knowledge in the field.

Unless the context clearly requires otherwise, throughout the description and the claims, the words "comprise", "comprising", and the like, are to be construed in an inclusive as opposed to an exclusive or exhaustive sense; that is to say, in the sense of "including, but not limited to".

The invention claimed is:

1. A method of noise reduction in a cable detection apparatus, the method comprising:
   filtering a cable detection input signal to increase the relative strength of signal components at a plurality of harmonics of a first frequency to at least one non-harmonic frequency between two of said harmonics of the first frequency;
   frequency shifting the filtered signal to frequency shift the high relative strength frequencies of the filter to coincide with reduced relative strength frequencies of the filtered signal; and
   emitting electromagnetic radiation substantially at at least one frequency corresponding to reduced strength frequencies of the filtered signal.

2. A method according to claim 1, the filtering further comprising reducing the relative strength of signal components at even harmonics of the first frequency to the strength at the plurality of harmonics of first frequency.

3. A method according to claim 1, further comprising outputting a sound signal corresponding to the frequency shifted signal.

4. A method according to claim 1, further comprising repeating at least one of the filtering steps.

5. A processing system for noise reduction in a cable detection apparatus, the processing system comprising:
   a program memory storing instructions for controlling a processor; and
   the processor for reading and implementing the instructions stored in the program memory;
   wherein the program instructions stored in the program memory comprise instructions for controlling the processor to detect harmonics of signal components of a cable detection input signal, filter the cable detection input signal to increase the relative strength of the signal components at a plurality of harmonics of a first frequency to at least one non-harmonic frequency between two of said harmonics, perform frequency shifting the filtered signal to frequency shift the high relative strength frequencies of the filter to coincide with reduced relative strength frequencies of the filtered signal, and emit electromagnetic radiation substantially at at least one frequency corresponding to reduced strength frequencies of the filtered signal.

6. A carrier medium carrying processor readable code for controlling a processor to detect harmonics of signal components of a cable detection input signal, filter the cable detection input signal to increase the relative strength of the signal components at a plurality of harmonics of a first frequency to at least one non-harmonic frequency thereof between two of said harmonics, perform frequency shifting the filtered signal to frequency shift the high relative strength frequencies of the filter to coincide with reduced relative strength frequencies of the filtered signal, and emit electromagnetic radiation substantially at at least one frequency corresponding to reduced strength frequencies of the filtered signal.

* * * * *